United States Patent [19]
Reinhardt

[11] Patent Number: 6,095,074
[45] Date of Patent: Aug. 1, 2000

[54] ILLUMINATED DOCK BUMPER

[75] Inventor: Jay A. Reinhardt, Liverpool, N.Y.

[73] Assignee: Dockmate U.S.A., Inc., Oneida, N.Y.

[21] Appl. No.: 09/324,134

[22] Filed: Jun. 2, 1999

[51] Int. Cl.$^7$ ................................................. B63B 59/02
[52] U.S. Cl. ............................................. 114/219; 405/215
[58] Field of Search ................................. 114/219, 220; 405/212, 213, 215, 216

[56] References Cited

U.S. PATENT DOCUMENTS

| | | | |
|---|---|---|---|
| 4,964,760 | 10/1990 | Hartman | 114/219 |
| 5,027,736 | 7/1991 | Drews | 114/219 |
| 5,184,562 | 2/1993 | Hallin | 114/219 |
| 5,873,460 | 2/1999 | Reinhardt | 206/321 |

*Primary Examiner*—Jesus D. Sotelo
*Attorney, Agent, or Firm*—Harris Beach & Wilcox, LLP

[57] ABSTRACT

A bumper for a boat dock is provided which is durable, resilient and visible at night. The bumper is constructed of an expanded polymer such as polyethylene or polypropylene. The bumper is preferably made of translucent polyethylene foam with a density of between 2 and 4 pounds per cubic foot. When polyethylene foam is subjected to impact, it absorbs the force of the impact and returns to its original shape. The present invention includes a light for illumination of the bumper itself or illumination of an area immediately adjacent the bumper. A slot in the bumper is provided for accepting the illumination source. If the bumper is translucent, as with white polyethylene foam, the illumination source may be inserted into the back of the bumper such that light is emitted through the front of the bumper. If the bumper is opaque, the illumination source may be inserted into a slot in the bottom of the bumper so that the light is emitted from the bottom of the bumper. The illumination source may be controlled by a radio frequency switch or by a timer.

29 Claims, 4 Drawing Sheets

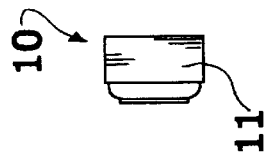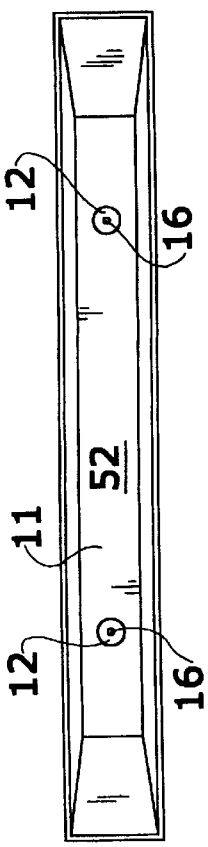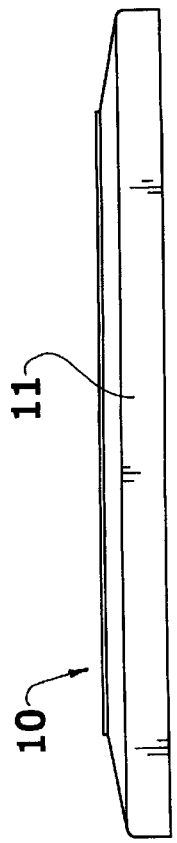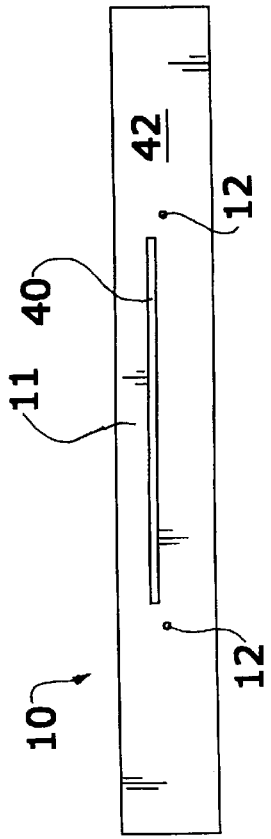
FIG.4
FIG.3
FIG.5
FIG.6

ILLUMINATED DOCK BUMPER

BACKGROUND OF THE INVENTION

1. Field of the Invention

This invention relates to a bumper for use on docks. More particularly, this invention relates to an illuminated foam bumper for use on docks to prevent damage to vehicles while docking.

2. Description of the Invention Background

Dock bumpers are used at docks to prevent damage to the docking vehicle and to the dock. The bumpers are used at boat docks, truck loading docks or any other dock for a vehicle. These bumpers come in many different forms. In U.S. Pat. No. 4,964,760, issued to Hartman, a bumper is diclosed which is constructed from urethane having a planer back surface and arcuate front surface. Other bumpers are manufactured from hard rubber. Often, these bumpers are dark in color and difficult to see at night. In a crowded marina, a boat operator may have difficulty seeing the bumper or even locating the slip assigned to him. U.S. Pat. No. 5,027,736 attempts to address the visibility problem by placing reflectors on the bumper. While this increases visibility where there is light to be reflected, if the boat or marina is not lit, or light is insufficient, the reflector will not provide enough visibility for the boat operator. It is desirable to have bumpers which are highly visible during both the day and night, under any ambient lighting conditions.

When used on boat docks, it is essential that the bumpers be constructed to withstand the harsh marine environment. It is also necessary that the bumpers provide sufficient cushioning to prevent damage to the vehicle, but are also resilient enough to maintain their shape and structural integrity when subjected to repeated impact over a period of years.

SUMMARY OF THE INVENTION

The present invention relates to a bumper for a dock which is durable, resilient and visible at night. The bumper is constructed of an expanded polymer such as polyethylene or polypropylene. The molding technique could be the one disclosed in U.S. Pat. No. 5,873,460, the disclosure of which is incorporated by reference. Preferably, the bumper is made of translucent polyethylene foam. Preferably, the density of the foam is between 1.5 and 4 pounds per cubic foot. Polyethylene and polypropylene foam have a "memory" such that when they are subjected to impact, they absorb the force of the impact and return to their original shape.

The present invention includes means for illumination of the bumper itself or illumination of an area immediately adjacent the bumper. One such means includes providing a slot in the bumper for accepting an illumination source. Preferably, the slot is generally rectangular in shape. If the bumper is translucent, as with white polyethylene or polypropylene foam, an illumination source may be press-fit into a slot in the back of the bumper such that light is emitted through all surfaces of the bumper. An illumination source is preferably in the form of a tubular incandescent illumination source, although other suitable illumination sources may be used, such as fluorescent or halogen light sources. One suitable illumination source is the twenty inch, twelve watt incandescent Striplight manufactured by FX Lighting Co., Inc. of West Babylon, N.Y. It is important that the illumination source not reach a temperature which is greater than the temperature of combustion of the foam. Polyethylene foam begins to degrade at temperatures of 240 degrees Fahrenheit and begins to emit smoke at a temperature of 400 degrees Fahrenheit. The Striplight illumination source reaches a surface temperature of 160 degrees Fahrenheit. For additional safety, the foam may include a combustion inhibitor.

Because the bumper is intended to be placed at a boat dock, the illumination source must be protected from the water to prevent an electrical short. The present invention includes four types of protection against a short circuit caused by water. First, the bumper is securely fastened against the dock, limiting the amount of water which can enter behind the bumper. Second, the slot for receiving the illumination source has a sloped bottom surface so that any water entering the slot will drain out. Third, the point where the electrical cord enters the illumination source is sealed with a sealing compound such as silicone sealant to prevent water from entering the illumination source. Fourth, the illumination source is enclosed in a translucent tube.

In one embodiment of the invention, the bumper is generally rectangular in cross section, although the bumper could have many different shapes. The bumper includes a plurality of countersunk holes for receiving fasteners to attach the bumper to the dock. The countersunk holes prevent the fasteners from projecting beyond the surface of the bumper to prevent damage to boats hitting the fasteners. One suitable fastening means is disclosed in U.S. Pat. No. 4,964,760, the disclosure of which is incorporated by reference.

In a second embodiment of the invention, the bumper is constructed of colored foam, such as, for example, a copolymer of blended polyethylene and polystyrene. In this embodiment, the bumper is opaque. Therefore, a rectangular slot is cut into the bottom surface and the illumination source is press-fit into the slot. Light is emitted from the bottom of the bumper to illuminate the water below the bumper.

The illumination source may include means for remote actuation such as a radio frequency actuated switch which allows the illumination source to be energized upon receiving a remote signal from a radio transmitter. Alternatively, the illumination source may be actuated by a infrared receiver mounted on the surface of the bumper which receives an infrared signal from a remote infrared transmitter.

The illumination source could also be controlled by a timer which is programmed to turn the illumination source on during normal nighttime docking hours and turn the illumination source off after normal nighttime docking hours are over.

These and other details, advantages and benefits of the present invention will become apparent from the detailed description of the preferred embodiment.

DETAILED DESCRIPTION OF THE DRAWINGS

The preferred embodiment of the invention will now be described, by way of example only, with reference to the accompanying Figures wherein like members bear like reference numerals and wherein:

FIG. 3 is a front view of one embodiment of the present invention;

FIG. 4 is an end view of the invention of FIG. 3;

FIG. 5 is a side view of the invention of FIG. 3;

FIG. 6 is a rear view of the invention of FIG. 3, shown without the illumination source;

Figure 8:
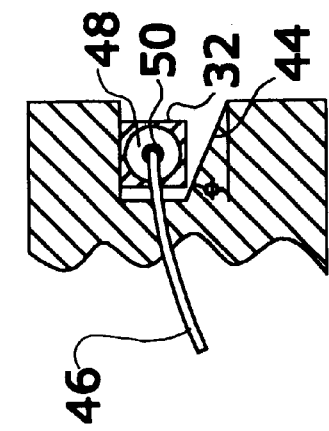
Figure 7:
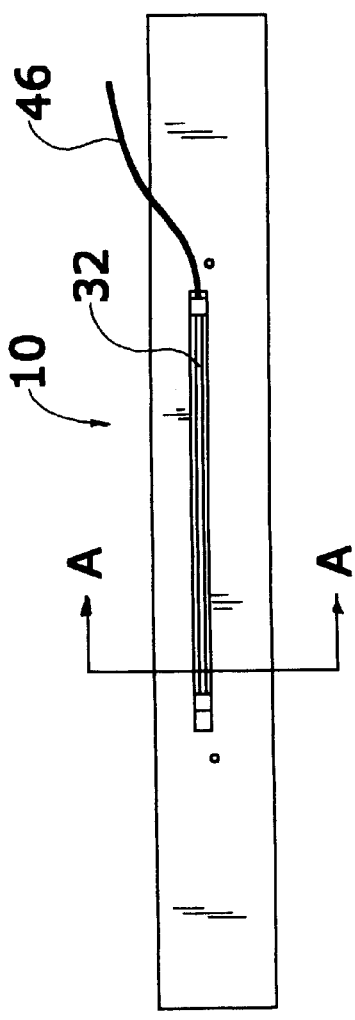
FIG. 7 is a rear view of the invention of FIG. 3 shown with the illumination source.
Figure 9:
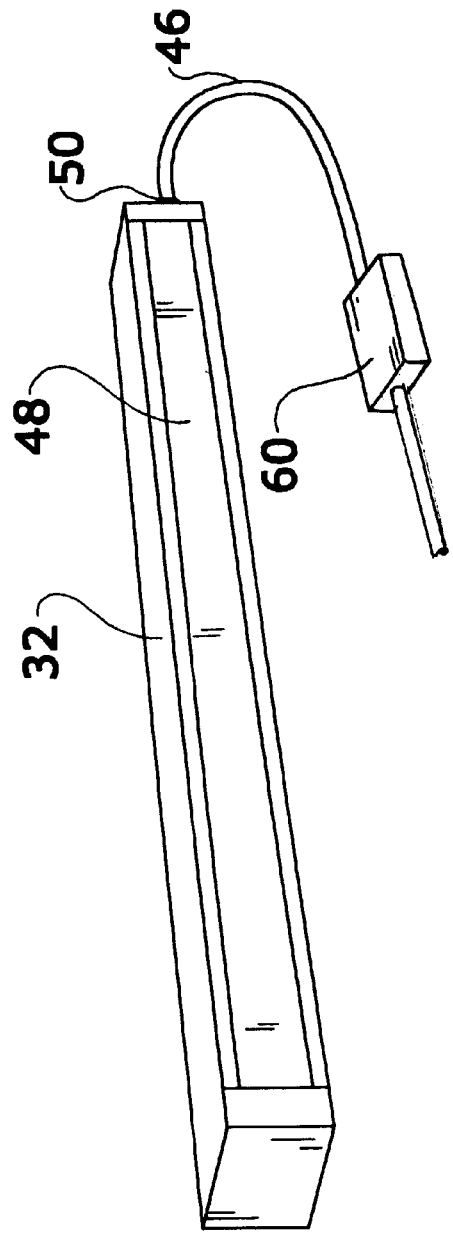
Figure 11:
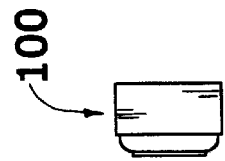
Figure 10:
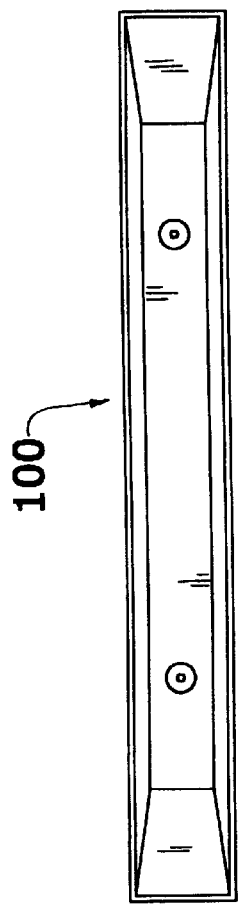
Figure 12:
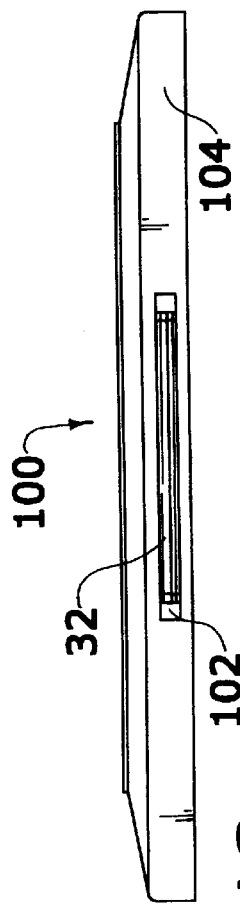
Figure 13:
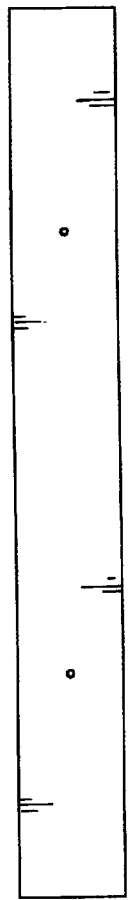

FIG. 8. is a cross-sectional view of the invention of FIG. 3 taken along the line A—A in FIG. 7;

FIG. 9 is a perspective view of the illumination source of the present invention;

FIG. 10 is a front view of a second embodiment of the present invention;

FIG. 11 is an end view of the invention of FIG. 10;

FIG. 12 is a side view of the invention of FIG. 10;

FIG. 13 is a rear view of the invention of FIG. 10; and

Figure 14:
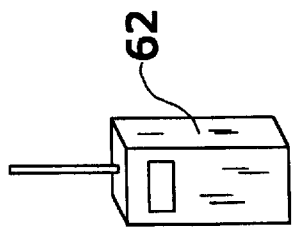

FIG. 14 is a perspective view of a radio frequency transmitter of the present invention.

DETAILED DESCRIPTION OF THE PREFERRED EMBODIMENTS

Referring now to the drawings, which are for the purpose of illustrating the preferred embodiment of the invention and not for the purpose of limiting the same, FIGS. 1–9 show one embodiment of the illuminated bumper 10 of the present invention.

Figure 1:
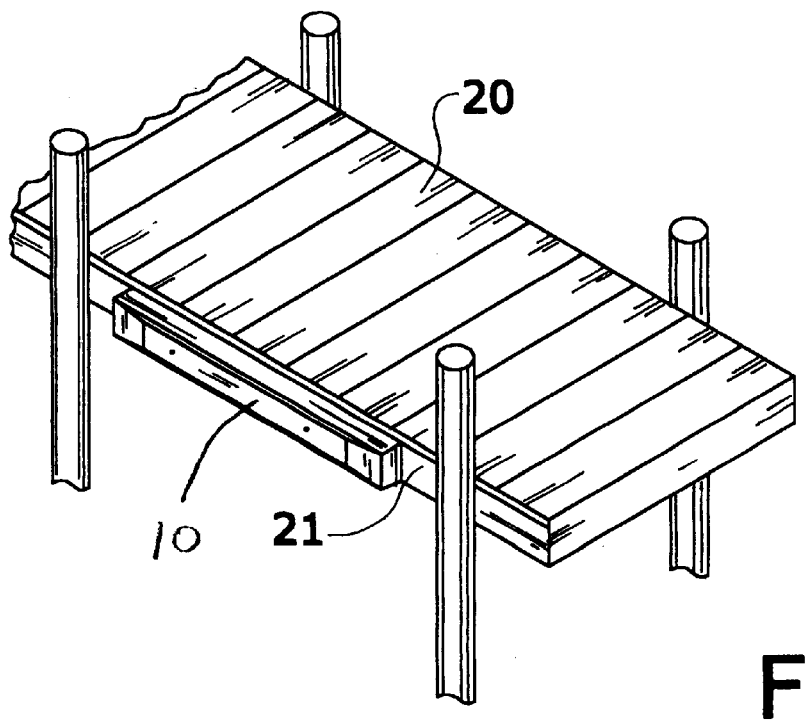
FIG. 1 is a perspective view of the present invention attached to a dock.
Figure 2:
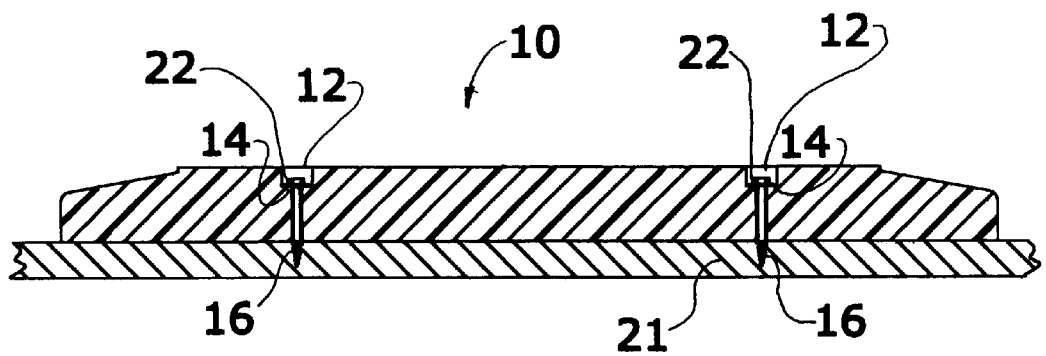
FIG. 2 is a cross-sectional view of the present invention attached to a dock.

In FIGS. 1–2, the bumper 10 is shown attached to a side 21 of a dock 20. The bumper includes a plurality of countersunk holes 12 including shoulder surfaces 14. Fasteners 16 are inserted into holes 14 for attaching the bumper 10 to a dock 20. The fasteners could be any suitable; fasteners such as bolts or screws. Washers 22 abut shoulders 14 to secure the bumper 10 to the dock 20.

The bumper 10 is constructed of expanded polymer foam. The bumper may be in any suitable shape. The bumper illustrated has a rectangular cross-section, but many other cross-sections are possible. The illustrated embodiment has a bumper body 11 which is approximately forty-eight inches in length, six inches in height and is approximately three and one half inches thick. In this configuration, a foam density of two to four pounds per cubic foot works well. Preferably, if the foam is polyethylene, the foam density is two pounds per cubic foot. One suitable polyethylene foam is Eperan foam manufactured by Kaneka Texas Corporation of Houston, Tex. If the foam is a mixed polyethylene and polystyrene copolymer, as with Arcel® sold by Nova France SARL of Paris, France, the density is about 2.75 pounds per cubic foot.

The bumper 10 includes a rectangular slot 40 on the dock engaging side 42 of the bumper 10 adapted to receive an illumination source 32, although other slot configurations are possible. I have found that a slot length of twenty-one inches long and an illumination source which is twenty inches long works well. The illumination source 32 is press-fit into the slot 40. The rectangular slot 40 includes a sloped bottom surface 44. Sloped bottom surface 44 assures that any water that enters the slot will drain out the slot. I have found that a one to two degree angle θ (FIG. 8) is sufficient to ensure that water does not accumulate in the slot 40, although other angles will work. The illumination source is connected to an electrical wire 46. Where the electrical wire 46 meets the light tube 48, the area is encased in silicon sealant 50. The illumination source 32 is of sufficient intensity to project light through the boat engaging side 52 the translucent bumper 10 to illuminate the bumper 10. One suitable illumination source 32 is a twelve watt incandescent illumination source. Because numerous bumpers 10 will be used at a marina, the wattage should be sufficiently low to prevent an overload of electrical circuits at the marina.

The illumination source 32 could be controlled by a radio frequency switch 60 which is actuated by a radio frequency transmitter 62 (FIG. 14). With this type of control, when the boat operator approaches the marina, he sends radio frequency transmission from the transmitter 62 to the switch 60. The illumination source 32 is then actuated and the operator is able to easily locate his slip and dock his boat. Such switches and transmitters are commercially available and need not be disclosed in detail here.

In another embodiment, the illumination source is actuated by a timer which energizes the illumination source 32 during normal nighttime docking hours and cuts power to the illumination source 32 during nondocking hours and during the daylight hours.

In a second embodiment of the invention, shown in FIGS. 9–13, bumper 100 is provided which is not translucent, as with mixed polyethylene and polystyrene. The bumper 100 includes a slot 102 cut into the bottom surface 104 of the bumper 100. The slot is adapted to receive an illumination source 32, which when illuminated projects light downward from the bumper 100. The means of attachment of the bumper 100 could be the same as that described above.

While this invention has been described in detail with reference to preferred embodiments, it should be appreciated that the present invention is not limited to those precise embodiments. Rather, in view of the present disclosure which describes the best mode for practicing the invention, many modifications and variations would present themselves to those of skill in the art without departing from the scope and spirit of this invention, as defined in the following claims.

What is claimed is:

1. A dock bumper for cushioning the impact of a vehicle approaching a dock comprising:

a bumper member of translucent expanded polymer material having first and second surfaces, said first surface adapted to receive the impact of a vehicle approaching the dock, said second surface adapted to contact the dock, said second surface including a slot receiving an illumination source, said illumination source adapted to project light through said first surface of said bumper member;

a fastener for fastening said bumper to said dock.

2. The apparatus of claim 1 wherein said illumination source is connected to an electrical source and said slot and said illumination source include means for preventing an electrical short circuit of said illumination source.

3. The apparatus of claim 2 wherein said illumination source includes an electrical cord connected to said illumination source at a connection point to carry electrical current to said illumination source.

4. The apparatus of claim 3 wherein said connection point is encapsulated in a sealing compound to prevent water from entering said illumination source through said connection point.

5. The apparatus of claim 1 wherein said slot includes a sloped bottom surface for preventing water which enters said slot from accumulating is said slot.

6. The apparatus of claim 1 wherein said illumination source is enclosed in a translucent tube.

7. The apparatus of claim 1 wherein said illumination source is an incandescent source.

8. The apparatus of claim 7 wherein said incandescent illumination source has a wattage requirement of 12 watts.

9. The apparatus of claim 1 wherein said expanded polymer material includes a combustion inhibitor.

10. The apparatus of claim 1 wherein said expanded polymer material is expanded polyethylene.

11. The apparatus of claim 1 wherein said expanded polymer material is expanded polypropylene.

12. The apparatus of claim 1 wherein said illumination source includes means for selectively energizing said illumination source.

13. The apparatus of claim 12 wherein said means for selectively energizing said illumination source includes a switch actuated by reception of a radio frequency transmission.

14. The apparatus of claim 12 wherein said means for selectively energizing said illumination source includes a switch actuated by a timer.

15. A dock bumper for cushioning the impact of a vehicle approaching a dock comprising:

a bumper member of opaque expanded polymer material having first and second surfaces, said first surface receiving the impact of a vehicle approaching the dock, said second surface adapted to contact the dock;

said bumper member further including a third surface including a slot adapted to receive an illumination source, said illumination source adapted to project light out of said slot;

a fastener for fastening said bumper to said dock.

16. The apparatus of claim 15 wherein said illumination source is connected to an electrical source and said and said illumination source includes means for preventing an electrical short circuit of said illumination source.

17. The apparatus of claim 16 wherein said illumination source includes an electrical cord connected to said illumination source at a connection point to carry electrical current to said illumination source.

18. The apparatus of claim 17 wherein said connection point is encapsulated in a sealing compound to prevent water from entering said illumination source through said connection point.

19. The apparatus of claim 15 wherein said illumination source is enclosed in a translucent tube.

20. The apparatus of claim 15 wherein said illumination source is an incandescent illumination source.

21. The apparatus of claim 20 wherein said incandescent light source has a wattage requirement of 12 watts.

22. The apparatus of claim 15 wherein said expanded polymer material includes a combustion inhibitor.

23. The apparatus of claim 15 wherein said expanded polymer material is expanded polyethylene.

24. The apparatus of claim 15 wherein said expanded polymer material is expanded polypropylene.

25. The apparatus of claim 15 wherein said expanded polymer material is a mixture of polyethylene and polystyrene.

26. The apparatus of claim 15 wherein said illumination source includes means for selectively energizing said illumination source.

27. The apparatus of claim 26 wherein said means for selectively energizing said illumination source includes a switch actuated by a reception of a radio frequency transmission.

28. The apparatus of claim 26 wherein said means for selectively energizing said illumination source includes a switch actuated by a timer.

29. A dock bumper for cushioning the impact of a vehicle approaching a dock comprising:

a bumper member of translucent expanded polymer material having a bumper body, said bumper body receiving the impact of a vehicle approaching the dock, said bumper body including a slot adapted to receive an illumination source, said illumination source adapted to project light through said bumper body to illuminate an area outside of said bumper body;

a fastener for fastening said bumper body to said dock.

* * * * *